US012811283B2

(12) United States Patent
Izquierdo Fernandez et al.

(10) Patent No.: US 12,811,283 B2
(45) Date of Patent: Nov. 24, 2026

(54) RADOME FOR VEHICLES

(71) Applicant: Zanini Auto Grup, S.A., Barcelona (ES)

(72) Inventors: Benjamin Izquierdo Fernandez, Barcelona (ES); Juan Carlos Lagomacini Lorente, Barcelona (ES); Jerson Jair Peralta Morales, Barcelona (ES); Josep Sanahuja Clot, Barcelona (ES); Augusto Mayer Pujadas, Barcelona (ES)

(73) Assignee: ZANINI AUTO GRUP, S.A., Barcelona (ES)

( * ) Notice: Subject to any disclaimer, the term of this patent is extended or adjusted under 35 U.S.C. 154(b) by 302 days.

(21) Appl. No.: 18/505,388

(22) Filed: Nov. 9, 2023

(65) Prior Publication Data

US 2024/0162603 A1 May 16, 2024

(30) Foreign Application Priority Data

Nov. 10, 2022 (EP) .................................... 22383082

(51) Int. Cl.
*H01Q 1/42* (2006.01)
*F21V 8/00* (2006.01)
(Continued)

(52) U.S. Cl.
CPC ................. *H01Q 1/42* (2013.01); *F21V 9/08* (2013.01); *G01S 7/028* (2021.05); *G01S 13/931* (2013.01);
(Continued)

(58) Field of Classification Search
CPC ........ H01Q 1/42; H01Q 1/3283; H01Q 1/422; G01S 7/028; G01S 13/931;
(Continued)

(56) References Cited

U.S. PATENT DOCUMENTS 8,816,932 B2 * 8/2014 Kawaguchi .............. H01Q 1/42 235/487
10,431,884 B2 * 10/2019 Takahashi ............ H01Q 1/3233
(Continued)

FOREIGN PATENT DOCUMENTS

| | | | |
|---|---|---|---|
| DE | 102017214129 | A1 | 2/2019 |
| DE | 102021102565 | A1 | 8/2022 |
| EP | 3563449 | B1 | 6/2021 |

OTHER PUBLICATIONS

European Search Report for EP22383082; Date of completion of the search Apr. 4, 2023.

*Primary Examiner* — Yonghong Li
(74) *Attorney, Agent, or Firm* — Kutak Rock LLP

(57) ABSTRACT

Radome for vehicles comprising a light source (28); a front unit (9) comprising a transparent layer (11) and a colored decoration layer (5); and a reflective light guide unit (10) comprising a light guide (13) and a reflective subunit (14), the front unit (9) and the reflective light guide unit (10) containing a layer (16) with a refractive index lower than the refractive index of the light guide (13) between them, wherein the reflective subunit (14) comprises a reflective layer (22), the reflective subunit (14) forms an integral single part with the light guide (13), positioned on its face opposite to the front unit (9).

The usage of a reflective unit at the rear of the light guide avoids the need of an air gap at the rear surface of the light guide, and the removal of the rear air gap improves the transmission performance of the radome.

19 Claims, 5 Drawing Sheets

(51) Int. Cl.

| | |
|---|---|
| ***F21V 9/08*** | (2018.01) |
| ***G01S 7/02*** | (2006.01) |
| ***G01S 13/931*** | (2020.01) |
| ***H01Q 1/32*** | (2006.01) |
| *F21W 104/00* | (2018.01) |

(52) U.S. Cl.
CPC ........... *G02B 6/001* (2013.01); *H01Q 1/3283* (2013.01); *F21W 2104/00* (2018.01); *G01S 2013/93271* (2020.01)

(58) Field of Classification Search
CPC .. G01S 2013/93271; G01S 7/027; G01S 7/02; G01S 7/03; F21V 9/08; G02B 6/001; F21W 2104/00; B60R 11/00; B60R 13/005; B60R 13/04; B60R 2011/0094; B60R 13/00; B60Q 1/00; B41M 1/40; B29C 45/14; B29K 2033/12; B29K 2069/00; B29K 2995/0026; B29L 2031/3456; B60K 11/08
See application file for complete search history.

(56) References Cited

U.S. PATENT DOCUMENTS

| | | | | |
|---|---|---|---|---|
| 11,958,401 | B2 * | 4/2024 | Grard ...................... | G09F 13/18 |
| 12,332,469 | B2 * | 6/2025 | de Mersseman ..... | G01S 17/931 |
| 2008/0309579 | A1 * | 12/2008 | Maeda ................. | H01Q 1/3291 343/872 |
| 2022/0404539 | A1 * | 12/2022 | Bajec Strle .......... | G02B 6/0035 |

* cited by examiner

RADOME FOR VEHICLES

This Application claim priority to European Patent Application No. 22383082.9 filed on Nov. 10, 2022, the disclosure of which is incorporated herein by reference in its entirety.

The present invention relates to a radome for vehicles, for protecting sensors enabling autonomous driving while presenting an outstanding aesthetical appearance, especially for radar devices disposed behind the front grill of an automobile.

BACKGROUND OF THE INVENTION

In general, radio transmitter-receiver devices, such as a millimeter-wave radar, have been employed as sensors for vehicular collision avoidance and adaptive cruise control systems.

In a radar system or the like that detects obstacles in front of an automobile and measures the distance to them, the antenna was preferably positioned in the center at the front of the vehicle to obtain maximum performance. Although the radar antenna could be installed near the front grill of automobile, it was preferable to conceal the antenna from view due to its non-aesthetic appearance and to shield the antenna from external environmental factors such as weather and airborne contaminants.

Radomes are components that combine a key functionality within the driver assistance systems and a very much relevant impact on the vehicle aesthetics since they usually represent the manufacturer's logo. They are positioned in front of the radar, hiding, and protecting it, and are positioned at a vehicle's visible location like the front grille.

The evolution towards higher levels of automated driving requires improving the radome performance to transmit the signals emitted and received by the radar. On the other side, current aesthetical trends include backlighting the emblem to enhance its visibility, especially in low ambient light conditions. This second function adds complexity to the radome that may degrade its transmission capabilities.

As an example, DE 10 2017 214 129 A1 discloses an emblem for a vehicle, in which the waves emitted and received by the radar in the field of view defined between the oblique line and the centerline must cross three main units and two air gaps between them. The increased performance of new generation radars requires the radome to produce reduced attenuation and angular error, that cannot be accomplished by such embodiment.

The presence of several air gaps and the lack of means to control their thicknesses harm the wave transmission capabilities of the radome, and therefore there is a need to reduce the number of air gaps, their thickness, and the variability of such thickness if they exist.

DISCLOSURE OF THE INVENTION

Therefore, an objective of the present invention is to provide a radome for vehicles that avoids the need of an air gap at the rear surface of the light guide to guide the light rays.

With the radome of the invention said disadvantages are solved, presenting other advantages that will be described below.

The radome for vehicles according to the present invention is defined in claim 1. Additional optional features are included in the dependent claims.

In particular, the radome for vehicles according to the present invention comprises:

- a light source;
- a front unit comprising a transparent layer and a colored decoration layer; and
- a reflective light guide unit comprising a light guide and a reflective subunit, the front unit and the reflective light guide unit containing an air layer with a refractive index lower than the refractive index of the light guide between them, wherein the reflective subunit comprises a reflective layer, the reflective subunit forms an integral single part with the light guide, positioned on its face opposite to the front unit.

Furthermore, the reflective subunit can also comprise:

- light extraction structures;
- a protective and opacity layer; and/or
- one or more laminated polymer foils, e.g., two laminated polymer foils, the reflective layer being placed between the laminated polymer foils.

The front unit can also comprise:

- a colored decoration layer, which can comprise cavities;
- a metal looking decoration layer;
- bright lighted areas;
- uncovered areas; and/or
- depressions.

Furthermore, the front unit and/or the reflective light guide unit can also comprise protrusions oriented to the low refractive index layer, i.e., the layer with a refractive index lower than the refractive index of the light guide.

The front unit can also comprise depression levelers placed inside the depressions, or the reflective light guide unit can comprise filling protrusions complementary with the depressions of the front unit.

The usage of a reflective unit at the rear of the light guide, forming an integral unit, avoids the need of an air gap at the rear surface of the light guide to guide the light rays, and the removal of the rear air gap improves the transmission performance of the radome.

Furthermore, the adoption of protrusions at surfaces of the front unit and/or light guide unit facing the other part allows to have a robust union between them with a very thin and controlled air gap.

BRIEF DESCRIPTION OF THE DRAWINGS

For better understanding of what has been disclosed, some drawings in which, schematically and only by way of non-limiting examples, some embodiments are shown.

DESCRIPTION OF PREFERRED EMBODIMENTS

Figure 1:
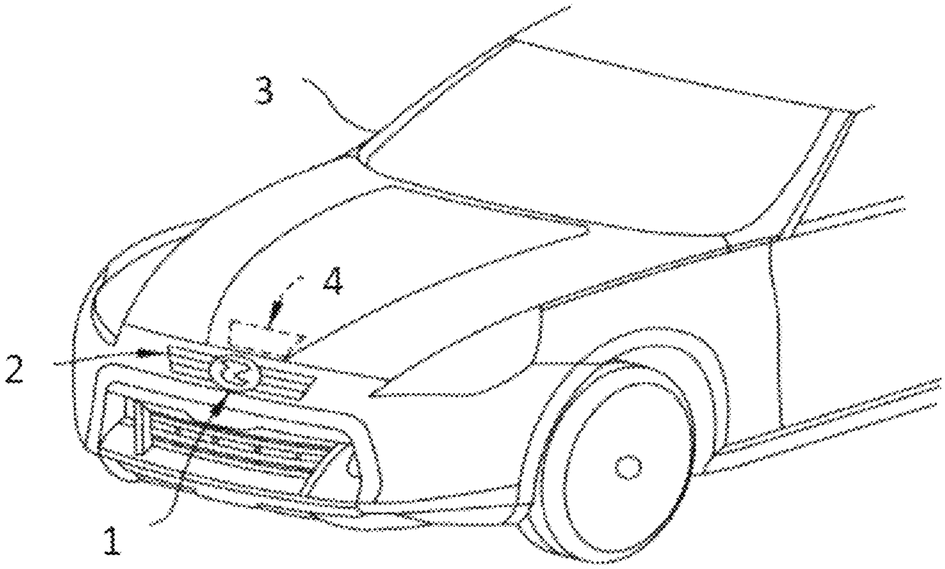
FIG. 1 is a fragmentary isometric view of the vehicle having a radome constructed in accordance with and embodying the invention positioned within a grill assembly and a radar antenna positioned behind the radome.

With reference now in detail to the drawings, wherein like numerals will be employed to denote like components throughout, as illustrated in FIG. 1, the reference numeral 1 denotes generally a decorative radome constructed in accordance with and embodying the invention configured for mounting within a grill assembly 2 of a motor vehicle 3.

Positioned within the vehicle 3 behind and in registration with the decorative radome 1 is a radar antenna 4.

Figure 2:
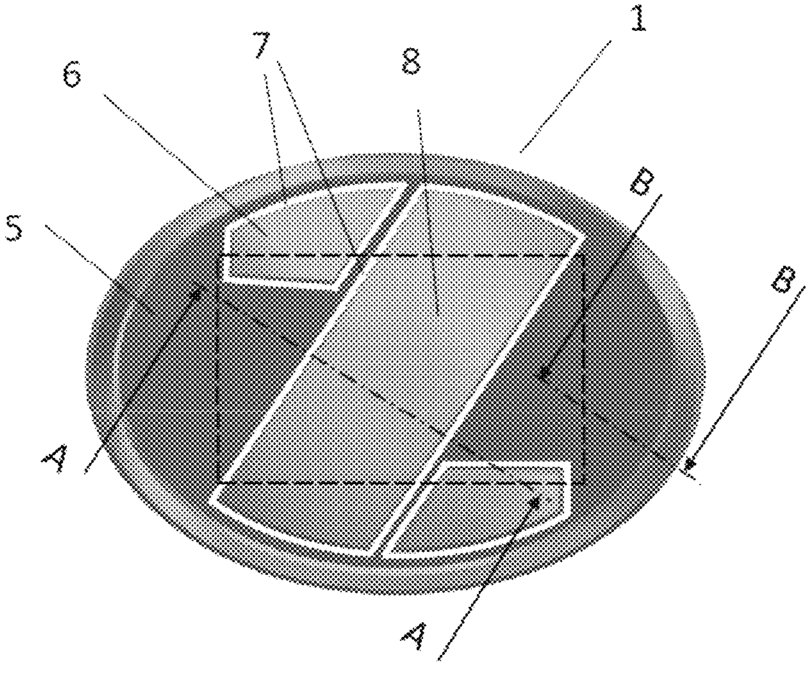
FIG. 2 is a front view of the radome, where a manufacturer's emblem may be identified by contrast of colored, metal looking and bright lighted areas.

FIG. 2 shows a front view of the radome 1, where it is visible a colored decoration layer 5, a metal looking decoration layer 6, and a bright lighted area 7 which all together represent, for instance, the manufacturer's emblem. It keeps high transmittance performance for the signal emitted and received by the protected radar antenna 4 in the field of view 8, defined by the discontinuous line.

In order to improve the transmission capabilities of the radome, there are just two main units 9, 10 in the area of the field of view 8, separated by a low refractive index layer 16. "Low refractive index layer" means that the refractive index of this layer 16 is lower than the refractive index of the light guide. One of them is the reflective light guide unit 10, which includes a material with high reflectivity on one of the surfaces of the light guide, and the other unit is the front unit 9. Both units 9, 10 are joined together leaving a thin and controlled low refractive index layer 16, which may contain air, between most of the surfaces facing each other.

The existence of the low refractive index layer 16 is required to properly transmit the light through the light guide. The low refractive index layer 16 is composed by air, which is a low refractive index material different, being only air or a combination. Suitable values of low refractive index are below 1.4 and, preferably, below 1.2. Air refractive index is 1.0. However, since the low refractive index layer 16 will most probably have different dielectric characteristics than its surrounding materials, it will be reduced to the minimum and as constant as possible thickness. The result is that the light is guided through the light guide by having a high reflectivity material on one surface and a low refractive index material on the opposite surface.

In general, and applicable to all the figures, the thickness of the different layers is not to scale because the relation between them is of orders of magnitude. Front face or surface of one component shall be understood as the face closer to an external observer in front of the radome at the exterior of the vehicle while rear face or surface of a component will be understood as the face closer to the radar 4.

Figure 3:
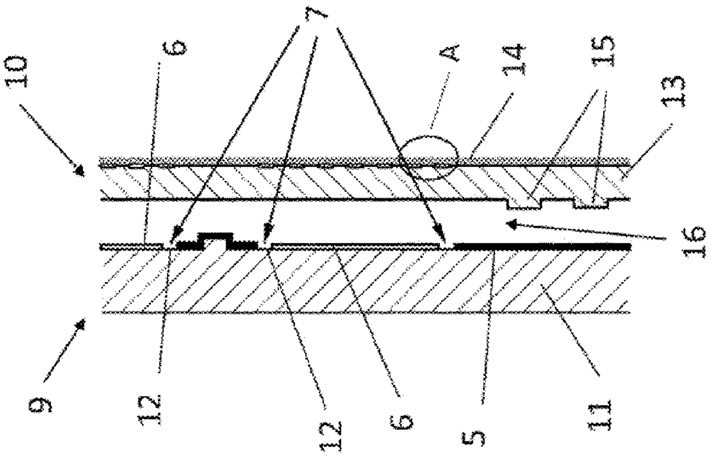
FIG. 3 is an exploded view of a schematical cross section according to A-A on FIG. 2, showing a first embodiment of the two main units within the field of view, providing a two-dimensional appearance of the emblem.

FIG. 3 shows a first embodiment of the radome according to the present invention. The two main units 9, 10 are shown in an exploded view, as they would look before being joined. This embodiment corresponds to the cross section according to A-A on FIG. 2 and is representative of the field of view 8. This embodiment is able to provide an emblem with a two-dimensional appearance.

The front unit 9 faces the exterior side of the vehicle 3 while the reflective light guide unit 10 faces the radar. The front unit 9 comprises a transparent layer 11, that is made of a material with high transmissive capability to both the visible light and the signal emitted and received by the protected radar 4. It may be made of a plastic resin like Polycarbonate (PC) and is usually obtained by injection molding.

The colored decoration layer 5 provides opacity to the visible light while maintaining a high degree of transmission of the signal emitted and received by the protected radar 4. It partially covers the transparent layer 11, leaving some uncovered areas 12. It may be obtained by printing a decoration by hot-stamping, pad printing, silk-screen printing or other manufacturing methods on a face of the transparent layer 11. This printing process requires the usage of a mask to leave some uncovered areas 12 by the colored decoration layer 5.

Alternatively, the colored decoration layer 5 may also be obtained by injection molding in a manufacturing combined molding process with the transparent layer 11, using some non-transparent compatible material. The colored decoration layer 5 is shown on the rear face of the transparent layer 11. However, it may be located on its front face.

The metal looking decoration layer 6 is positioned on the rear face (closer to the radar 4) of the set formed by the transparent layer 11 and the colored decoration layer 5. The metal looking decoration layer 6 may be seen by an external observer through the uncovered areas 12 left by the colored decoration layer 5. The combination of opaque areas of colored decoration layer 5 and metal looking decoration layer 6 generates an emblem that may be clearly seen by the external observer with daytime illumination as shown on FIG. 2.

The metal looking decoration layer 6 provides a bright appearance thanks to the usage of metals, metalloids and or oxides or combinations of them. In any case, it must ensure high electrical resistivity to reduce the attenuation caused to the signal emitted and received by the protected radar 4. This thin and controlled thickness layer may be deposited, for instance, by a Physical Vapor Deposition (PVD) magnetron sputtering process or by a Plasma Enhanced Chemical Vapor Deposition (PECVD) process, or others, depending on the composition of the layer. Alternatively, the metal looking decoration layer 6 may be formed by a nano-multilayer polymer film which provides optical interference reflection.

The metal looking decoration layer 6 may show partial transparency to the visible light or total opacity to it. In the first case, the light extracted from a light guide 13 will be able to pass through it. Bright lighted areas 7 may be defined, where the presence of both the colored decoration layer 5 and the metal looking decoration layer 6 is reduced or removed.

These bright lighted areas 7 show better transparency to the light extracted from the light guide 13. The bright lighted areas 7 may be obtained by applying masks during the process of making the colored decoration layer 5 and the metal looking decoration layer 6 or by laser trimming after making these layers. The bright lighted areas 7 provide an increased brightness and may be used to improve the contrast between the colored decoration layer 5 and the metal looking decoration layer 6 when following the outline of the metal looking decoration layer 6.

Depending on the characteristics of the materials used, the front unit 9 may require a protective coating, not shown, on its front face.

The reflective light guide unit 10 is integrally formed by the light guide 13 and a reflective subunit 14, which will be described later on.

Either the front unit 9, the reflective light guide unit 10 or both may comprise protrusions 15 on the surface facing the other unit. These protrusions 15 are present in areas corresponding to the colored decoration layer 5 to reduce or avoid their visibility from the exterior. Some of these protrusions 15 are used to join both units 9, 10 and some others are used to adjust the low refractive index layer 16 that will remain between most of the surfaces facing each other when both units 9, 10 are joined. Different technics of joining both parts may be used like applying glue or laser welding in the contact areas between both units at the protrusions 15 used to make the join.

Figure 4:
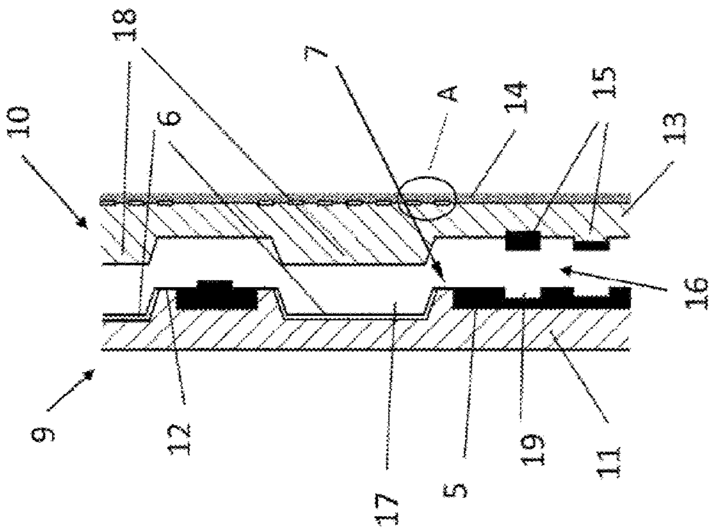
FIG. 4 is an exploded view of a schematical cross section according to A-A on FIG. 2, showing a second embodiment of the two main units within the field of view, providing a three-dimensional appearance of the emblem.

FIG. 4 shows a second embodiment of the radome according to the present invention. The two main units 9, 10 are shown in an exploded view, as they would look before being joined. This embodiment corresponds to the cross section according to A-A on FIG. 2 and is representative of the field of view 8. This embodiment is able to provide an emblem with a three-dimensional appearance.

In this second embodiment, identical reference numerals are given to the components that are quite similar to the corresponding components of the first embodiment and redundant description is omitted therein.

In this second embodiment, the transparent layer 11 shows some depressions 17 on its rear face.

The appearance of the colored decoration layer 5 shown on this figure corresponds more to the expected result of a combined molding process with the transparent layer 11, using some non-transparent compatible material.

The metal looking decoration layer 6 in this embodiment follows the profile of the depressions 17, providing a three-dimensional appearance to the shown emblem.

The light guide 13 of this embodiment includes filling protrusions 18 on the surface facing the front unit 9. Their purpose is to fill most of the volume of the depressions 17, leaving a minimal low refractive index layer 16 between the main units 9, 10 in order to maintain the transmission performance required to the radome.

The embodiment shown on FIG. 4 shows the possibility that the protrusions 15 of the light guide 13 are partially or totally made of a material which is opaque to the infrared waves. This facilitates the joining to the counterpart when a laser welding process is applied. This may be obtained by injection molding in a manufacturing combined molding process with the light guide 13, using some infra-red opaque compatible material.

The colored decoration layer 5 may comprise some cavities 19 which will be filled by the protrusions 15 which are used to join both units.

Figure 5:
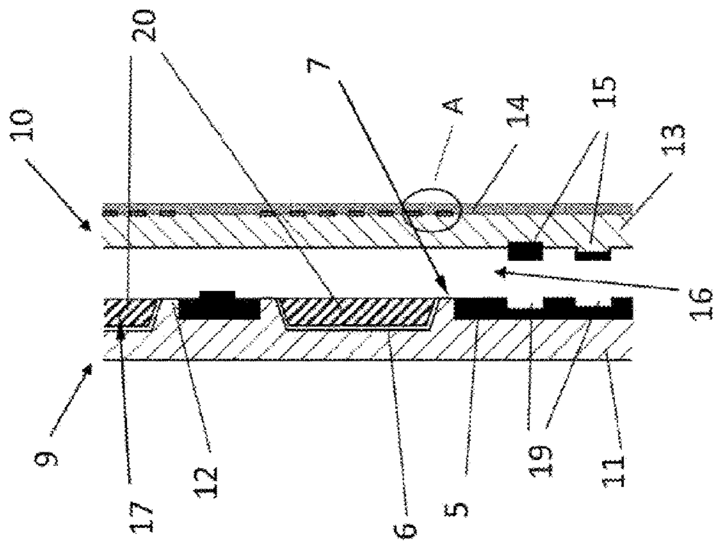
FIG. 5 is an exploded view of a schematical cross section according to A-A on FIG. 2, showing a third embodiment of the two main units within the field of view, providing a three-dimensional appearance of the emblem.

FIG. 5 shows a third embodiment of the radome according to the present invention. The two main units 9, 10 are shown in an exploded view, as they would look before being joined. This embodiment corresponds to the cross section according to A-A on FIG. 2 and is representative of the field of view 8. This embodiment is able to provide an emblem with a three-dimensional appearance.

In this third embodiment, identical reference numerals are given to the components that are quite similar to the corresponding components of the first and second embodiments and redundant description is omitted therein.

In this third embodiment, the front unit 9 includes depression levelers 20. They occupy the space left between the metal looking decoration layer 6 covering the depressions 17 and the rear surface of the front unit 9 facing the light guide 13.

This allows that the only low refractive index layer 16 between the front unit and the reflective light guide unit 10 is the one defined by the protrusions 15 that are used to adjust the low refractive index layer 16 between both parts.

The material of the depression levelers 20 is such that shows similar behavior in front of the millimeter waves emitted and received by the radar 4 than the ones of the transparent layer 11 and light guide 13. Some exemplary materials are Polycarbonate (PC) or Polyurethane (PU). If they are transparent and the metal looking decoration layer 6 also shows partial transparency to the visible light, the light extracted from the light guide 13 will be able to pass through them to the exterior of the radome 1.

FIGS. 6-9 show different embodiments of the reflective subunit 14, according to the Detail A on FIGS. 3-5, respectively.

The reflective subunit 14 forms an integral single part with the light guide 13. It has the function of guiding the light through the light guide 13, thanks to its reflective properties on one of the surfaces of the light guide 13 combined with the low refraction index layer 16 on the opposite surface. Additionally, it is able to extract the light through the transparent or partially transparent areas of the front unit 9.

Light extraction structures 21 on FIGS. 6-9 are positioned on the rear side of the light guide 13, opposed to the front unit 9. They are generally located facing away from the bright lighted areas 7 and/or the metal looking decoration layer 6. Different techniques of producing these light extraction structures 21 is through hot-stamping, pad printing or silk-screen printing of usually a white decoration applied on the rear face of the light guide 13 or on the front face of the reflective subunit 14.

Alternatively, a micro-texturing process may be applied on some areas of the surface of the mold that manufactures the light guide 13, corresponding to the areas of the light extraction structures 21. Both manufacturing technics are able to provide this light extraction capabilities to the light extraction structures 21.

The reflective layer 22 may comprise high reflectivity metals, metalloids and or oxides or combinations of them with high electrical resistivity to reduce the attenuation of the signal emitted and received by the protected radar 4. It may be deposited, for instance, by a Physical Vapor Deposition (PVD) magnetron sputtering process or by a Plasma Enhanced Chemical Vapor Deposition (PECVD) process or others, depending on the composition of the layer.

Alternatively, the reflective layer 22 may be formed by a nano-multilayer polymer film which provides optical interference reflection or by a material with a lower refractive index than the one of the transparent layer 11 like, for instance, PMMA.

Figure 6:
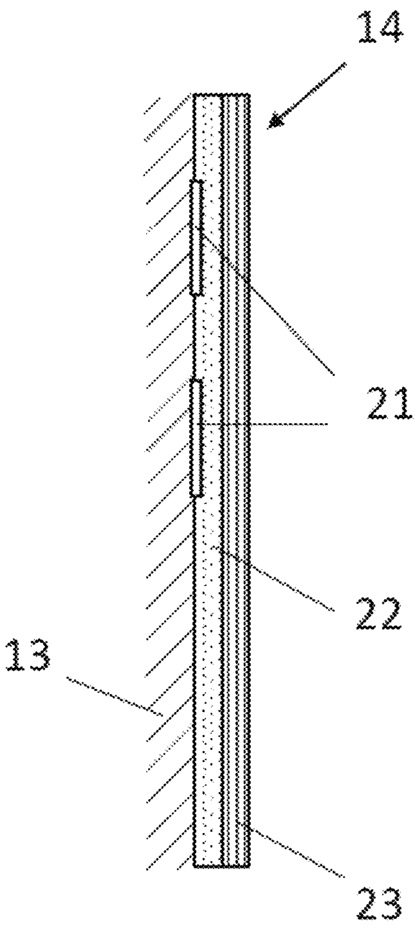
FIG. 6 is schematical cross section of a first embodiment of the reflective subunit of Detail A on FIG. 3, 4 or 5.

FIG. 6 shows a first embodiment of the reflective subunit 14. In this case, the reflective layer 22 is attached to the rear face of the light guide 13 without the need of any laminated polymer foil.

This embodiment may be obtained by producing the light extraction structures 21 when molding the light guide with a microtextured mold or by decorating the rear face of the already molded light guide 13. The reflective layer 22 may be deposited afterwards on the resulting rear face.

Alternatively, this embodiment may be obtained by applying the light extraction structures 21 on the front face of a reflective layer 22 film and insert molding the resulting element at the rear face of the light guide 13.

A protective and opacity layer 23 may be applied on the rear face of the reflective layer 22 to increase its resistance to environmental agents and/or to improve its opacity to the visible light.

Figure 7:
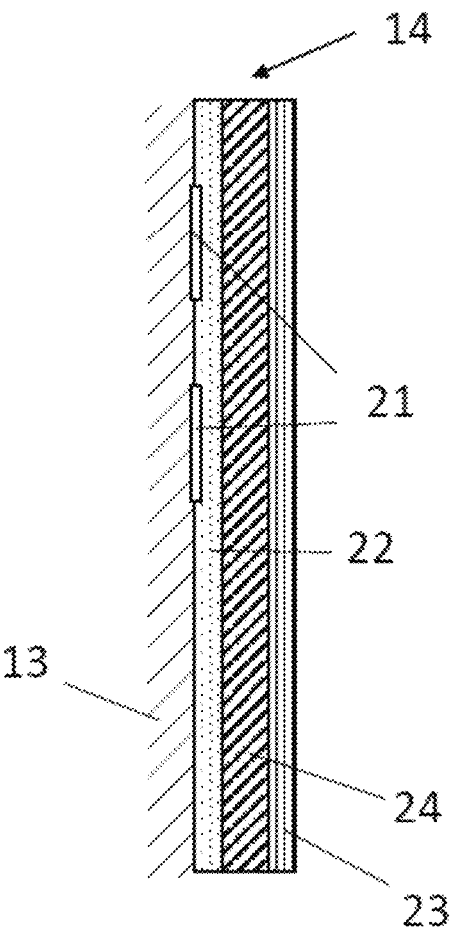
FIG. 7 is schematical cross section of a second embodiment of the reflective subunit of Detail A on FIG. 3, 4 or 5.

FIG. 7 shows a second embodiment of the reflective subunit 14. In this case, the reflective layer 22 is located at the front face of a laminated polymer foil 24. The light extraction structures 21 are applied on the front face of the reflective layer 22 and the resulting element is insert molded at the rear face of the light guide 13.

A protective and opacity layer 23 may be applied on the rear face of the laminated polymer foil 24 to increase its resistance to environmental agents and/or to improve its opacity to the visible light.

Figure 8:
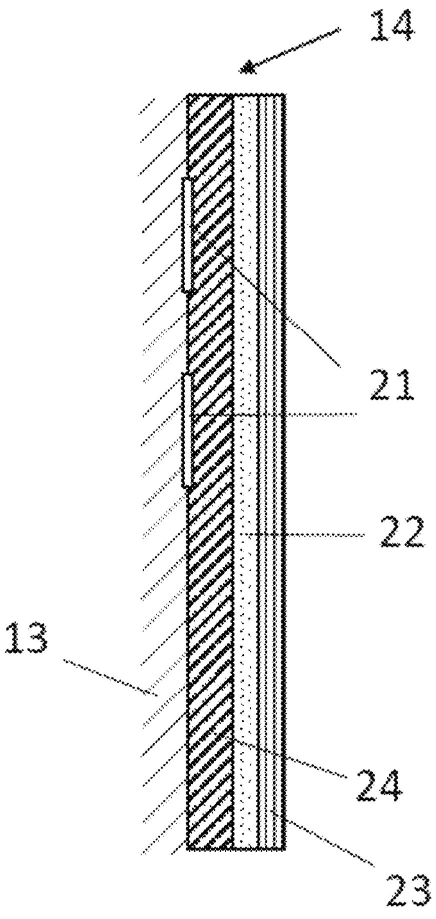
FIG. 8 is schematical cross section of a third embodiment of the reflective subunit of Detail A on FIG. 3, 4 or 5.

FIG. 8 shows a third embodiment of the reflective subunit 14. In this case, the reflective layer 22 is located at the rear face of a laminated polymer foil 24. The light extraction structures 21 are applied on the front face of the laminated polymer foil 24 and the resulting element is insert molded at the rear face of the light guide 13.

A protective and opacity layer 23 may be applied on the rear face of the reflective layer 22 to increase its resistance to environmental agents and/or to improve its opacity to the visible light.

Figure 9:
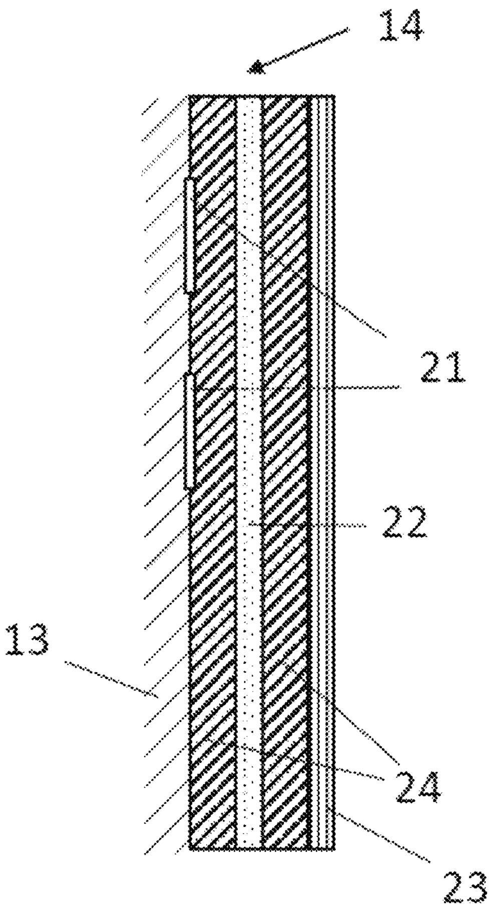
FIG. 9 is schematical cross section of a fourth embodiment of the reflective subunit of Detail A on FIG. 3, 4 or 5.

FIG. 9 shows a fourth embodiment of the reflective subunit 14. In this case, the reflective layer 22 is located between two laminated polymer foils 24. The light extraction structures 21 are applied on the front face of the front laminated polymer foil 24 and the resulting element is insert molded at the rear face of the light guide 13.

A protective and opacity layer 23 may be applied on the rear face of rear laminated polymer foil 24 to increase its resistance to environmental agents and/or to improve its opacity to the visible light.

Figure 10:
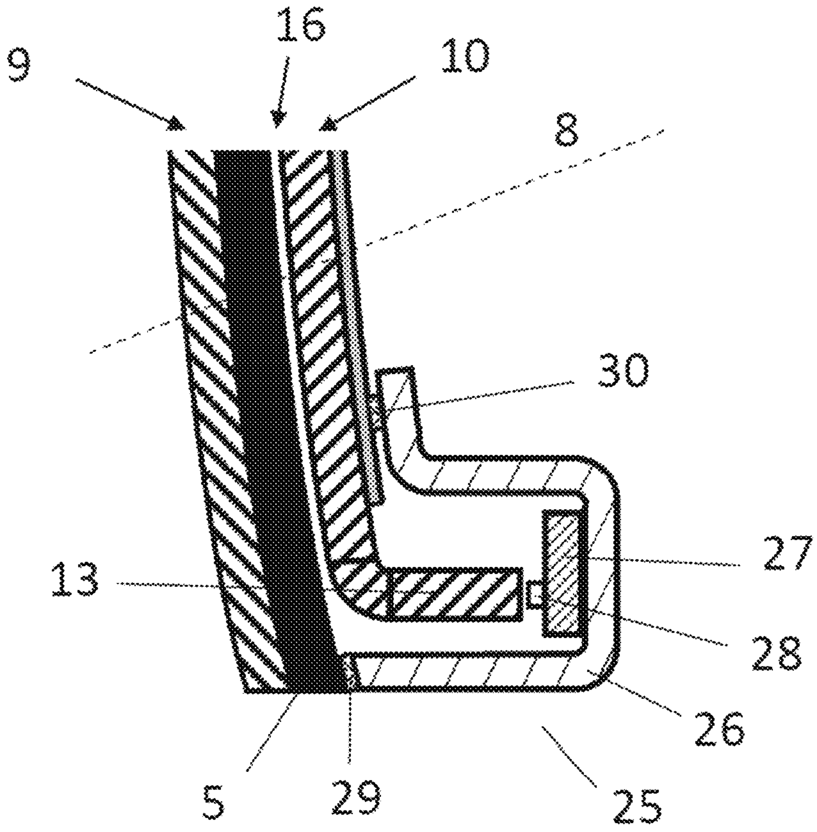
FIG. 10 is schematical cross section according to B-B on FIG. 2, showing the perimetral electronics assembly.

FIG. 10 shows the structure of the radome at its field of view 8 and outside it. The structure at the field of view 8 comprises only two units, the front unit 9 and the reflective light guide unit 10, with only one thin low refractive index layer 16 between them. The area outside the field of view 8 may comprise fixtures (not shown here) of the radome 1 to the vehicle. It also comprises a perimetral electronics assembly 25, which generates the light that is transmitted along the light guide 13 before it is extracted by the light extraction structures 21 through the transparent or partially transparent areas of the front unit 9.

The perimetral electronics assembly 25 comprises a perimetral opaque housing 26 that holds and contains electronic components, such as a printed circuit board 27 and a light source 28 with one or more light emitting diodes (LEDs) 28. The light source 28 is able to illuminate the light guide 13 through one of its edges.

The perimetral opaque housing 26 is usually obtained by a molding process of a plastic like Acrylonitrile butadiene styrene (ABS) or a blend of Polycarbonate and Acrylonitrile butadiene styrene (PC/ABS), resulting in a part that offers opacity to the visible light.

In order to ensure the required mechanical stability of the whole radome, the required sealed conditions for the electronic components and the required opacity to the periphery of the radome, the perimetral opaque housing 26 is joined to the colored decoration layer 5 along an outer perimeter by a gluing or welding union 29 and joined to the rear side of the reflective subunit 14 through a gluing or welding union 30 along an inner perimeter.

Although reference has been made to specific embodiments of the invention, it is apparent to a person skilled in the art that the described radome is susceptible of numerous variations and modifications, and that all the details mentioned can be replaced by other technically equivalents, without departing from the scope of protection defined by the appended claims.

The invention claimed is:

1. Radome for vehicles, characterized in that the radome comprises:

a light source (28);

a front unit (9) comprising a transparent layer (11) and a colored decoration layer (5); and a reflective light guide unit (10) comprising a light guide (13) and a reflective subunit (14), the front unit (9) and the reflective light guide unit (10) containing an air layer (16) with a refractive index lower than the refractive index of the light guide (13) between the front unit and the reflective light guide unit, wherein the reflective subunit (14) comprises a reflective layer (22), the reflective subunit (14) forms an integral single part with the light guide (13), positioned on its face opposite to the front unit (9), and wherein the colored decoration layer (5) comprises cavities (19) complementary with protrusions (15) of the reflective light guide unit (10) for joining the front unit (9) and the reflective light guide unit (10).

2. The Radome for vehicles according to claim 1, wherein the reflective subunit (14) also comprises light extraction structures (21).

3. The Radome for vehicles according to claim 2, wherein the reflective subunit (14) also comprises a protective and opacity layer (23).

4. The Radome for vehicles according to claim 3, wherein the reflective layer (22) is applied on the light guide (13) by a Physical Vapor Deposition (PVD) magnetron sputtering process or by a Plasma Enhanced Chemical Vapor Deposition (PECVD) process.

5. The Radome for vehicles according to claim 4, wherein the front unit (9) also comprises a metal looking decoration layer (6).

6. The Radome for vehicles according to claim 5, wherein the front unit (9) also comprises bright lighted areas (7).

7. The Radome for vehicles according to claim 1, wherein the reflective subunit (14) also comprises a protective and opacity layer (23).

8. The Radome for vehicles according to claim 7, wherein the reflective subunit (14) also comprises one or more laminated foils (24).

9. The Radome for vehicles according to claim 1, wherein the reflective subunit (14) also comprises one or more laminated foils (24).

10. The Radome for vehicles according to claim 9, wherein the reflective subunit (14) comprises two laminated foils (24), the reflective layer (22) being placed between the laminated foils (24).

11. The Radome for vehicles according to claim 1 wherein the reflective layer (22) is applied on the light guide (13) by a Physical Vapor Deposition (PVD) magnetron sputtering process or by a Plasma Enhanced Chemical Vapor Deposition (PECVD) process.

12. The Radome for vehicles according to claim 1, wherein the front unit (9) also comprises a metal looking decoration layer (6).

13. The Radome for vehicles according to claim 1, wherein the front unit (9) also comprises bright lighted areas (7).

14. The Radome for vehicles according to claim 1, wherein the front unit (9) and/or the reflective light guide unit (10) comprise protrusions (15) oriented to the air layer (16).

15. The Radome for vehicles according to claim 1, wherein the front unit (9) also comprises uncovered areas (12).

16. The Radome for vehicles according to claim 1, wherein the front unit (9) also comprises depressions (17).

17. The Radome for vehicles according to claim 16, wherein the front unit (9) comprises depression levelers (20) placed inside the depressions (17).

18. The Radome for vehicles according to claim 16, wherein the reflective light guide unit (10) comprises filling protrusions (18) complementary with the depressions (17) of the front unit (9).

19. The Radome for vehicles according to claim 1, wherein a perimetral opaque housing (26) of a perimetral electronics assembly (25) is joined to the colored decoration layer (5) and to the reflective subunit (14) through gluing or welding unions (29, 30).

* * * * *